UNITED STATES PATENT OFFICE.

ARTHUR L. TANNEHILL, OF GARY, INDIANA.

PROCESS OF PRODUCING ARTIFICIAL RESIN.

1,389,791.  Specification of Letters Patent.  Patented Sept. 6, 1921.

No Drawing.   Application filed March 27, 1919. Serial No. 285,545.

*To all whom it may concern:*

Be it known that I, ARTHUR L. TANNEHILL, a citizen of the United States, residing at Gary, in the county of Lake and State of Indiana, have invented certain new and useful Improvements in Processes of Producing Artificial Resin, of which the following is a specification.

The present invention relates to the production of artificial resin by polymerization of light oils obtained from coal gas or from distillates of coal tar.

In the co-pending application, Serial No. 301,971 filed June 5, 1919, by Howard N. Copthorne and myself, is described a process of producing artificial resin in solution by adding sulfuric acid to fractions of the light oil distillates of coal gas or coal tar which are recovered at temperatures of between 150° and 200° C., and permitting the reaction to proceed under such conditions as will develop the artificial resin in solution. In the production of artificial resin by this process, difficulty has been encountered in obtaining a product that will dry satisfactorily when used as a varnish or surfacing material, it being found that it does not sufficiently harden to avoid sticking. I have discovered that the physical condition of the resin produced by the process referred to is governed mainly, if not wholly, by the temperature under which the reaction proceeds during the process of polymerization of the distillates. If permitted to proceed uncontrolled, the reaction which develops polymerization is accompanied by temperatures considerably above the boiling point, particularly if agitation is maintained sufficient to develop normal reaction. But these high temperatures affect undesirably the artificial resin produced. I have found by extensive research that if the temperature be kept down to a comparatively low degree this soft and sticky condition of the artificial resin produced will be avoided; in fact, the melting point or solidifying point of the resin obtained by the polymerization process is, within certain limits, proportional to the temperature that prevails during the polymerization, that is to say, the lower the temperature of polymerization the harder will be the resin product. This rule obtains down to temperatures of 35° C. Below that, the temperature has little effect on the resin, and since the reaction is greatly retarded with still lower temperature, the work should be carried on at a temperature between 30° and 40° C.

The temperature of the reaction can be controlled in any known way, as, for instance, by cooling coils, or by air spray. The latter method will have the advantage of maintaining agitation in the material, which is desirable to insure the reaction.

I have further discovered that in the polymerization of these distillates for the production of artificial resin, it is desirable to introduce the neutralizing reagent in gaseous form in order to avoid emulsifying the solution and insure thorough distribution, and that ammonia gas is the most desirable reagent that may be used for neutralizing the material after the desired degree of polymerization has been reached, particularly if this ammonia gas be carried into the solution on a current or sprays of air, which will have the effect of distributing the reagent uniformly through the liquid. This neutralizing reagent will thoroughly neutralize the solution without forming a troublesome emulsion. I have further found a distinct advantage arising from the use of ammonia gas as a neutralizing agent, in that the artificial resin when so neutralized becomes very pale in color, which is a property greatly to be desired in a varnish or a resin to be used in varnish making. A further advantage arises from the fact that being in gaseous form, all that portion which has not reacted with the sulfuric acid may be collected and recirculated for subsequent neutralizing action, or the same gas circulated continuously through a batch of material in the neutralizing step until the neutralization is completed, thereby insuring thorough neutralization without the use of an excessive amount of reagent, or leaving any excess of reagent in the liquid.

As an illustrative example of the process, take solvent naphtha obtained from coal tar or from coal gas, and particularly the fraction thereof which distils between 150° and 200° C., and place the same in a suitable agitator, which may be of almost any construction but which must be provided with means for keeping the contents cool, as, for instance, cooling coils. Commence the agitation, and add 2% by volume of caustic soda solution (specific gravity 1.2) and continue agitation for about ten minutes. Stop the agitation and permit the caustic soda solution to settle to the bottom, and then draw it off. Repeat this operation and remove the last trace of caustic soda by a thorough draining. This treatment removes phenolic compounds and greatly improves the odor of the ultimate product when finished. Now start the agitation again, and add concentrated sulfuric acid (66° Bé.) to the extent of about 2% by volume of the fluid to be treated, adding the acid slowly. Now continue the agitation for four or five hours, or until the acid becomes very finely distributed through the fluid, at the same time holding down the temperature by flowing cold water through the coils as necessary. The agitation is now stopped, and the material is allowed to stand for three or four days, with occasional stirring to keep the acid in suspension. When polymerization has proceeded to such a degree that the solution contains about 50% of solid resin, it should be drained into a tank where a current of ammonia gas is passed through it for several hours. It is then heated up to about 60° C. and allowed to settle, so that the ammonium sulfate formed by the neutralizing step will precipitate. The fluid will then be found to be a very pale and nearly clear solution containing 50 to 55% of solid resin. This solution may be applied directly or mixed with prepared linseed oil as a varnish. If it be desired to make a high grade varnish, it may be put into a still and the liquid portion of the solution distilled off so as to leave the thick resin which may be drawn out and solidified. The solid resin obtained in this way may be admixed with linseed oil and made into a varnish, as is done with any other resin.

When the liquid is distilled to recover the solid resin, the evaporated portion may be collected and returned to the agitator and treated with acid again in order to produce more of the resin.

In the absence of unpolymerizable solvents, polymerization cannot well be carried beyond the point of 55% of the naphtha, as otherwise the fluid will become too viscous for convenient handling, particularly in the steps of neutralizing and clarifying. By arresting polymerization at or near the point stated, the resin will remain in a highly fluid state, and the reagent for neutralizing it can more readily permeate all parts thereof. By keeping the temperature down as suggested herein, it is much easier to arrest polymerization at the desired point.

The resin produced by this process is very hard and is very valuable for the manufacture of high grade varnishes, since it is not attacked by water, dilute acids, or alkali.

After polymerization has proceeded to the desired extent, the acid, which is separated by settling and drawing off, may be re-used in a subsequent batch of material.

I claim:

1. The improvement in the art of producing artificial resin by the polymerization of solvent naphtha obtained from coal gas or coal tar, which improvement consists in arresting the polymerization while the resin is in a highly fluid state.

2. The improvement in the art of producing artificial resin by the polymerization of solvent naphtha obtained from coal gas or coal tar, which improvement consists in arresting the polymerization and separating the main portion of the polymerizing reagent while the resin is still in a highly fluid state, and then neutralizing the remaining solution with the highly fluid resin in suspension therein.

3. The improvement in the art of producing artificial resin by the polymerization of solvent naphtha obtained from coal gas or coal tar, which improvement consists in arresting the polymerization and separating the main portion of the polymerizing reagent while the resin is still in a highly fluid state, and then neutralizing the remaining solution with the highly fluid resin in suspension therein by the use of a gaseous neutralizing reagent.

4. The improvement in the art of producing artificial resin by the polymerization of solvent naphtha obtained from coal gas or coal tar, which improvement consists in removing the heat of the reaction generated by the polymerization as the operation proceeds, and arresting the polymerization while the resin is in a highly fluid state.

5. The improvement in the art of producing artificial resin by the polymerization of solvent naphtha, which improvement consists in maintaining a temperature of between 30 and 40° C. during the reaction of polymerization, and arresting such reaction when about 55% of resin has developed in the solution.

6. The improvement in the art of producing artificial resin by the polymerization of the solvent naphthas obtained from coal gas or coal tar, which improvement consists in removing the heat of the reaction generated by the polymerization as the operation proceeds, and arresting the polymerization when not more than about 55% of resin has developed in the solution.

7. The process of producing artificial resin by the polymerization of solvent naphtha, which consists in adding sulfuric acid to solvent naphtha distillate, continuing polymerization until the desired proportion of resin has been produced in the solution, and then neutralizing the solution by the use of ammonia gas.

8. The process of producing artificial resin by the polymerization of solvent naphtha, which consists in adding sulfuric acid to solvent naphtha distillate, continuing polymerization until the desired proportion of resin has been produced in the solution, and then neutralizing the solution by the use of ammonia gas carried in a curent of air.

9. The process of producing artificial resin, which consists in polymerizing solvent naphtha distillate until the desired proportion of resin has been produced in solution, and then agitating the solution by a stream of air containing ammonia gas until the solution is neutralized.

10. The process of producing artificial resin, which consists in polymerizing solvent naphtha distillate, removing the heat of the reaction during the polymerization, and neutralizing the resultant solution by means of ammonia gas.

11. The improvement in the art of producing artificial resin, which consists in polymerizing liquid solvent naphtha to produce the resin, neutralizing the resultant solution by passing an alkaline gas therethrough, and recovering the gas which passes through the liquid.

12. The process of producing artificial resin by the polymerization of solvent naphtha, which consists in adding an acid polymerizing reagent to the solvent naphtha distillate, continuing polymerization until the desired proportion of resin has been produced in the solution, and then neutralizing the solution by the use of ammonia gas.

Signed at Gary, Indiana, this 19th day of March, 1919.

ARTHUR L. TANNEHILL.